April 6, 1943.  J. R. SKEEN  2,316,140
TREATMENT OF GAS DISTRIBUTION SYSTEMS
Filed July 22, 1939
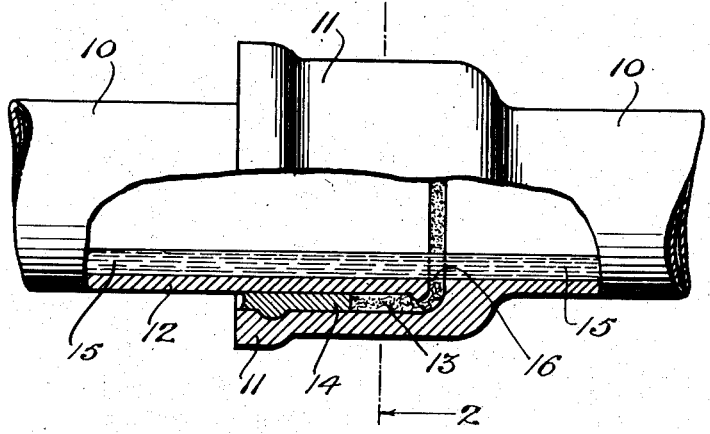
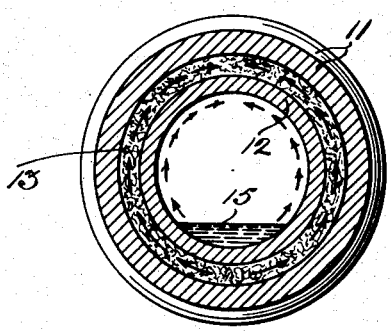
Inventor:
John R. Skeen
by his Attorney
Hugo G. Kenman Patented Apr. 6, 1943

2,316,140

UNITED STATES PATENT OFFICE 2,316,140

TREATMENT OF GAS DISTRIBUTION SYSTEMS

John R. Skeen, Philadelphia, Pa., assignor to The United Gas Improvement Company, a corporation of Pennsylvania Application July 22, 1939, Serial No. 285,941

8 Claims. (Cl. 48—194)

This invention pertains generally to the treatment of the interiors of gas mains or other gas enclosures for the purpose of sealing joints or laying dust, or both.

Systems for the distribution of gas include conduits or mains which are usually laid underground, and which comprise sections of pipe joined together by means of welding, by means of packed joints, by means of screw joints, or otherwise.

The welded joint is a more recent development and is used chiefly to join pipe sections of steel or iron, other than cast iron.

Older mains are usually made up of cast iron pipe sections joined by means of bell and spigot or other similar joints. These joints are usually packed with hemp, jute, flax or other cellulosic material which in turn is backed up with lead or cement or other material in a well known manner.

The lead or cement seal is tight and effective in preventing gas leakage when first applied but soon loses this quality due to expansion and contraction of the main with change in temperature or for other reasons. When this happens the effectiveness of the joint in preventing gas leakage depends entirely upon the packing.

Manufactured gas for a long period of years has been produced for the most part locally, that is, in or near the points to be supplied. Until recently, no special effort has been made to recover condensible materials from the gas prior to its delivery to the mains. As a consequence, such gas is upon delivery to the mains more or less saturated with moisture and is generally referred to as being wet.

In the case of a wet gas the lower temperature of the mains particularly during cold weather causes considerable condensation of water as well as of other material composed chiefly of hydrocarbons, the latter being referred to generally as "drip oil."

Since the joint packing, namely, hemp, jute, flax or other cellulosic material is exposed to the interior of the gas main, such packing is also exposed to the wet gas and any condensed water, the latter accumulating and/or flowing along the bottom of the main.

As a result the packing if uncoated absorbs moisture and is swollen thereby as the moisture penetrates the cells of the fibers of the packing, causing the packing to form a gas-tight fit.

Generally speaking, there are two types of cellulosic packing or yarn which have been used in joints of gas mains or other gas enclosures.

These different types of packing may be referred to as "untarred" and "tarred" respectively. The untarred type of packing is capable of absorbing water which in turn swells the packing. This capacity continues until partially or wholly impaired by the accumulation of tar, resin and gum formed from constituents in the gas, the tar, resin and gum coating the packing. When this occurs the packing takes on the characteristics of the tarred type.

Until recently, when high pressure distribution has come into more general practice, the bell and spigot or other joints packed with the untarred type of packing gave very little trouble since the gas generally contained sufficient moisture to keep the packing saturated and, therefore, gas-tight.

However, when the gas is compressed to a high pressure for long distance distribution in welded mains before being expanded to low pressure for local distribution, most of the water vapor (and some of the oils) are condensed out. There is then no longer sufficient water vapor in the gas when expanded to the low pressure to keep the fibrous packing in the packed joints in the low pressure mains moist. On the contrary, the gas is so dry that it rapidly draws out any absorbed moisture in the packing at a rate depending somewhat upon the accumulation of tar, resin and gum. However, the packing eventually dries out since the accumulation of tar, resin and gum is rarely capable of sealing moisture in the fibers. It follows that when the packing dries out serious leaks occur.

In other words, as long as the main is used for distributing ordinary manufactured gas, and assuming that the untarred type of packing was originally installed, very little trouble with joint leakage is experienced. However, when the service is changed over to a manufactured gas of lower moisture content, or over to natural gas which is characterized by a very low moisture content or over to mixtures, the packing dries out and shrinks sufficiently to cause the joint to become leaky.

While the use of the tarred type of packing avoids the absorption of water in the first instance, and consequent drying and shrinking should the moisture content of the gas be lowered, nevertheless, the tarred type of packing has not been wholly successful. This is thought to be due in part to shrinkage in volume or cracking of the tar due to drying or polymerization, and also in part to the desirability of swelling a packing in a joint to cause the packing to conform more exactly to the contour of the joint and to reduce voids between the fibers.

Soap is sometimes applied to the untarred type of packing. Such treatment, however, does not prevent drying and shrinking.

Referring now to dust, over a period of years the water condensed from wet gas together with other constituents of the gas such as carbon dioxide, hydrogen sulfide, hydrocyanic acid, naphthalene, and so forth, have in many instances, caused extensive corrosion of the interior walls of the mains. The products of corrosion have accumulated on the walls of the mains and, in many instances, large quantities have become disconnected and have collected along the bottom.

Due to the presence of relatively large quantities of moisture, largely responsible for the corrosion in the first instance, the products of corrosion were maintained in a wet condition and did not tend to form dust in any appreciable quantity.

Therefore, until high pressure distribution came into practice, and while the use of natural gas or natural gas mixtures was less widespread, very little difficulty was experienced with the formation of dust in mains from the products of corrosion.

In other words, as long as a main is used for distributing ordinary wet manufactured gas very little trouble with dust resulting from corrosion is experienced. However, when the service is changed over to a manufactured gas of low moisture content, or over to natural gas or natural gas mixtures which are characterized by very low moisture content, the moisture on and in the corrosion products dries out and such products become a serious source of dust.

The presence of considerable quantities of dust in the gas flowing through the mains of a distribution system is very undesirable because dust tends to clog up customer service connections, interferes with the proper operation of meters, and tends to clog up burners and pilot outlets.

Under extreme conditions, corrosion may be so severe as to form a serious obstruction in the main itself by reducing its effective cross-sectional area such as by the accumulation of dust in piles in the main.

For joint sealing and dust laying purposes it is highly preferable to treat the interiors of the mains, including the joint packing, with a substantially non-volatile liquid capable of swelling the joint packing to substantially the same extent as water, as referred to in my co-pending application, Serial Number 128,556, filed March 1, 1937, which will mature into Patent 2,167,139 on July 25, 1939.

However, there has been a certain degree of commercial acceptance of a treatment, though temporary, involving the impregnation of the joint packing with a material capable of forming a liquid seal in the interstices between the fibres, though causing no marked swelling of the packing fibres such as is caused by water.

Liquids of this character include various aromatic oils of which neutral oil derived from tar naphtha after the removal of any acids and/or bases is an example. Resin forming constituents such as indene and coumarone are preferably removed.

Tar naphtha is obtained from the distillate obtained upon the distillation of coal tar, carburetted water gas tar, oil gas tar and the like.

Acids or bases or both are removed by conventional washing operations or otherwise.

In many distribution systems, tar, resin, gum and dust have been deposited upon the packing and operate to exclude the foregoing substances from contact with the packing and from effectively entering into the interstices between the fibres. In the case of packing which was originally tarred, the foregoing substances, of course, are also similarly excluded. Neutral oils are very deficient as softening or solubilizing agents for tar, resin and gum.

The tar, resin, and gum likewise prevent these materials from reaching and wetting active sources and potential sources of dust.

A feature of this invention is to provide an improved composition for forming a liquid seal in cellulosic packing in joints of gas distribution systems which possesses sufficient solvent power with respect to tar, resin and gum to cause the sealing constituents of the composition to enter into the interstices of the packing with sufficient rapidity for practicable purposes.

Another feature of the invention is to provide an improved dust laying composition which possesses sufficient solvent power with respect to tar, resin and gum to cause the dust laying constituents of the composition to wet dust sources and to wet and be absorbed by accumulations of dust with sufficient rapidity for practicable purposes.

Another feature of the invention is to provide a joint sealing and/or dust laying composition having improved wetting qualities not only for tar, resin and gum, but also for cellulosic fibre and the metal of the main walls.

Another feature of the invention is to provide a new article of manufacture and a process for making the same.

Other features of the invention will become more apparent to persons skilled in the art as the specification proceeds.

Generally speaking, the improvement in liquid sealing compositions comprises two or more mutually miscible liquids, one of which is adapted to form a liquid seal in the packing and to lay dust; and the other of which is especially adapted (a) to soften or dissolve tar, resin and/or gum which may cover the packing, and (b) to assist the spreading and climbing of the liquid sealing agent in the joint packing and on the main walls. In the event that these two or more liquids are not in themselves mutually miscible in the quantities employed, a miscibility agent may be added. Such agent may comprise a liquid solvent in which the two or more liquids employed are soluble.

The first mentioned liquid of the leak proofing composition comprises the above mentioned aromatic oil.

Examples of the second mentioned liquid of the leak proofing composition comprise, preferably with certain exceptions to be hereinafter noted, one or more of the following:

(1) The phenols generally and particularly phenol, the cresols, the xylenols, their homologues and mixtures.
(2) Heterocyclic compounds containing ring nitrogen, their homologues and mixtures.

Heterocyclic compounds containing ring nitrogen may be classified as follows:
  (a) Five-membered heterocyclic systems. Examples are pyrrole; pyrrolidine; pyrroline; indole; oxindole; indoxyl; dioxindole; isatin; carbazole; pyrazole; pyrazoline; pyrazolone; thiezole; imidazole; oxazole; methyl-4-phenyloxazole; 4,5-diphenyloxazole; thiodiazole; sym-triazole; v-triazole; and tetrazole.
  (b) Six-membered heterocyclic systems. Examples are pyridine; hydroxypyridines; methylpyridines; N-methylpyridone; methoxypyridine; aminopyridine; dimethylpyridine; piperidine; pyridazine; pyrimidine; pyrazine; quinoline; isoquinoline; dihydroquinoline; tetrahydroquinoline; methyl quinolines such as quinaldine; carbostyril; ethyl quinolines; acridine; phenanthridine; phenanthralines; phenazine, phenoxazine; phenthiazine; piperazine; and quinoxaline. Crude coal tar quinoline is an example of a mixture containing other materials. The boiling range may be from 95° C. to 350° C. but a narrower cut, such as between 200° C. to 300° C. or 350° C., is preferred.
(3) Aldehydes generally and including both aliphatic and cyclic aldehydes and especially those having from 4 to 8 carbon atoms with from 5 to 7 carbon atoms preferred. Examples of aldehydes are acetaldehyde, propionaldehyde, butyraldehyde, amylaldehyde, hexylaldehyde, heptylaldehyde, octylaldehyde, crotonaldehyde, benzaldehyde, furfuraldehyde, their homologues and mixtures.
(4) Ketones generally and particularly liquid ketones.
  Aromatic ketones such as acetophenone, benzophenone and orthohydroxyacetophenone are especially effective. The liquid ketones are preferred. Other aromatic ketones are meta and para hydroxyphenone, tetramethyldiaminobenzophenone. (Michler's ketone), tetraethyldiaminobenzophenone) phenyltolyl ketone, etc., many of which are solid at ordinary temperatures.
  Liquid aliphatic ketones which are especially effective are acetone, diacetone alcohol and mesityl oxide. Other aliphatic ketones are methyl ethyl ketone, methyl n-propyl ketone, methyl isopropyl ketone, diethyl ketone, methyl n-butyl ketone, ethyl n-propyl ketone, methyl isobutyl ketone, ethyl isopropyl ketone, methyl sec-butyl ketone, methyl tert-butyl ketone, methyl n-amyl ketone, dipropyl ketone, diisopropyl ketone, hexamethylacetone, and methyl neopentyl ketone.
  An example of a liquid alicyclic ketone is cyclohexanone.
  Ketones of higher molecular weight than those of the above examples may be employed, if desired, especially if they are unsaturated and contain more than one ketone group.
(5) Arylamines, their homologues and mixtures. The arylamines may be classified as follows:
  (a) Aniline and its homologues. Examples of homologues are orthotoluidine; meta toluidine; para toludiene; 1, 2, 3-xylidine; 1,2,4-xylidine; 1,3,2-xylidine; 1,3,4-xylidine; 1,3,5-xylidine; 1,4,2-xylidine; commercial xylidine; 2,4,6-trimethylaniline (mesidine); and 2,4,5-trimethylaniline (pseudocumidine).
  (b) N-Alkylanidines. Examples are monomethylaniline; dimethylaniline; mono n-butylaniline; di - n - butylaniline; ethylaniline; methylethylaniline; isoamylaniline; benzylaniline (a solid); methylbenzylaniline; phenyltrimethylammonium hydroxide; benzylamine; benzyldialkylamines; benzytrimethylammonium hydroxide; and phenylethylamine.
  (c) Acyl arylamines. Examples are acetanilide (a solid); acetoacetanilide (a solid); and phenylglycine (a solid).
  (d) Polyaryl amines. Examples are diphenylamine (a solid); and triphenylamine (a solid).
  (e) Aryl diamines. Examples are orthophenylenediamine (a solid); meta-phenylenediamine (a solid); paraphenylenediamine (a solid); 2,3-toluylenediamine (a solid); 2,4-toluylenediamine (a solid); 2,5-toluylenediamine (a solid); 2,6-toluylenediamine (a solid); 3,4-toluylenediamine (a solid); 3,5-toluylenediamine (a solid); and the diamino naphthalenes (solids).
(6) The aromatic alcohols generally, and particularly liquid aromatic alcohols such as benzyl alcohol, alpha phenyl ethyl alcohol, beta phenyl ethyl alcohol, and phenylpropyl alcohol, their homologues and mixtures. Examples of aromatic alcohols which are solid at ordinary temperatures are diphenylcarbinol and triphenylcarbinol. The aromatic alcohols are characterized by having one of hydrogen atoms in the side chain replaced by hydroxyl, whereas in the phenols nuclear hydrogen has been replaced. The aromatic alcohols may also be regarded as aliphatic alcohols in which one of the hydrogens has been replaced by an aryl group. It is the combination of an aryl group with a hydroxyl group which apparently makes the aromatic alcohols particularly effective for my purposes.
(7) Esters generally and particularly ethyl benzoate, amyl benzate, phenyl methyl acetate, their homologues and mixtures.
(8) Ethers generally and particularly phenyl ethyl ether and monophenyl ether of ethylene glycol, their homologues and mixtures.

While heterocyclic compounds containing ring nitrogen and particularly when liquid, are especially suitable for tar, resin and gum cutting purposes, in the case of mains having joints packed with cellulosic fibre material such as jute and hemp, I prefer to employ those compounds which have no deleterious action upon the jute or hemp irrespective of whether the treatment is for joint sealing purposes or solely for dust laying purposes.

I find that materials such as pyridine appear to attack jute, whereas alkylated or phenylated nitrogen containing rings as occur, for instance in the alkylated pyridines or in quinoline, isoquinoline, and their alkyl derivatives, such as the methyl quinolines, evidence no such action whatsoever. Apparently alkyl groups and phenyl groups prevent disintegration of the jute.

Therefore, in the case of mains having joints packed with cellulosic fibre packing, I prefer to employ as tar, resin and gum penetrating agents compounds having either alkylated or phenylated nitrogen containing rings. In the case of alkylated nitrogen containing rings, methylated and ethylated rings are preferred since compounds with shorter alkyl groups appear to have greater penetrating power, although other compounds comprising alkylated nitrogen containing rings may be employed without departing from the broad concept of the invention.

While the arylamines generally and particularly the liquid arylamines are especially suitable for tar, resin and gum cutting purposes in the case of mains having joints packed with cellulosic fibre material such as jute, I prefer to employ arylamines which have no deleterious action upon the jute irrespective of whether the treatment is for joint sealing purposes or solely for dust laying purposes.

I find that materials such as aniline appear to attack jute, whereas nuclear alkylated anilines such as the toluidines and the xylidines evidence no such action whatsoever. Apparently, the alkyl groups attached to the ring prevent any disintegration of the jute.

Therefore, in the case of mains having joints packed with cellulosic fibre packing, I prefer to employ as tar resin and gum penetrating agents nuclear alkylated anilines, and particularly nuclear methylated anilines since compounds with shorter alkyl groups appear to have greater penetrating power, although other arylamines may be employed without departing from the broad concept of the invention.

Likewise, in the case of joints packed with other materials such as rubber, I prefer to employ as tar, resin and gum penetrating agents those materials which do not attack rubber or other packing material employed.

Preferably the neutral oil is free from substantial quantities of relatively low boiling materials. A boiling range such that the preponderate portion boils between 170° C. and 390° C. may be regarded as representative.

As an illustration, three representative samples showed boiling ranges by the A. S. T. M. method as follows:

*Table 1*

| Sample, cc. | 1 °C | 2 °C | 3 °C |
|---|---|---|---|
| 1st drop | 189 | 175 | 182 |
| 5 | 201 | 186 | 189 |
| 10 | 216 | 204 | 221 |
| 15 | 227 | 226 | 239 |
| 20 | 239 | 251 | 253 |
| 25 | 253 | 265 | 262 |
| 30 | 269 | 278 | 269 |
| 35 | 279 | 287 | 273 |
| 40 | 291 | 294 | 280 |
| 45 | 302 | 300 | 288 |
| 50 | 306 | 304 | 293 |
| 55 | 310 | 309 | 298 |
| 60 | 315 | 313 | 303 |
| 65 | 319 | 319 | 306 |
| 70 | 324 | 324 | 309 |
| 75 | 326 | 329 | 314 |
| 80 | 331 | 340 | 319 |
| 85 | 346 | 354 | 325 |
| 90 | 354 | 375 | 336 |
| 95 | 362 | 380 | 365 |
| 96 | 365 | | |

Analysis of these samples for bases, acids and aromatic compounds by successive treatment with dilute $H_2SO_4$, dilute caustic, dilute $H_2SO_4$, and finally concentrated $H_2SO_4$, showed that the amounts of bases and acids present were negligible and that the aromatics account for 90 to 95 percent. of the total.

Fractional distillation of sample 1 at reduced pressure (6 mm.) using a 20 inch glass helix-packed column gave the following data:

*Table 2*

| Temp. °C. | Percent by wt. | Refractive index 20° C. | Description of fraction |
|---|---|---|---|
| 52–65 | 12.9 | 1.5166 | Clear liquid. |
| 65–83 | 6.1 | .00 | White crystalline solid. |
| 83–124 | 15.7 | 1.5305 | Yellow liquid. |
| 124–135 | 17.6 | 1.5628 | Light yellow liquid. |
| 135–160 | 16.9 | 1.5731 | Do. |
| 160–181 | 7.4 | 1.5841 | Yellow liquid. |
| Residue | 12.5 | | Black viscous tar. |
| Loss | 10.9 | | |

Samples of neutral oil may vary depending upon the source of the naphtha, conditions of polymerization for removal of the resin forming constituents, and distillation of the neutral oil after recovery.

Further analysis of the above three samples showed the following:

*Table 3*

| Sample | 1 | 2 | 3 |
|---|---|---|---|
| Specific gravity 20/20 | .9899 | .9933 | .9898. |
| Viscosity, Saybolt sec. 100° F. | 44 | 42 | 40. |
| Aniline point °C | 72 | 69 | 69. |
| Refractive index 20° F | 1.5547 | 1.5616 | 1.5619. |
| Color | Dark green | Dark amber | Dark amber. |

Aniline points were determined by a modified dilution method in which equal volumes of neutral oil and a light Pennsylvania distillate were mixed and the aniline point determined on the mixture. This method was used because the aniline point of the oil was so low (−.23° C. for sample 1) that close determinations were difficult. The modified method gave the comparative results which were desired.

It is, of course, to be understood that detailed data on samples 1 to 3 is given merely for purposes of illustration to show representative materials.

Any desired quantity of my tar, resin and/or gum softening and/or solubilizing and wetting agent (referred to hereinafter and in the claims for convenience as "tar penetrating agent") may be added. I find, for example, that for ordinary purposes from 5% to 20% is sufficient, but in extreme cases such as when the packing is of the tarred type or large quantities of tar resin and/or gum have deposited from the gas that much larger quantities are preferably employed, for example, up to say 70% or more.

Furthermore, the more drastic treatment or treatments may be followed by a less drastic treatment or treatments such as the treatment for ordinary purposes.

Moreover, the main may be treated first with the tar penetrating agent and then with the dust laying and joint sealing agent without departing from the broad concept of the invention.

The presence of my tar penetrating agent greatly increases the distribution of the treating liquid and its penetration through tar, resin, gum and dust incrustations and, therefore, not only greatly decreases the time of treatment, but also greatly increases the thoroughness and effectiveness of the treatment when tar, resin, gum and/or dust incrustations are present.

I find that my tar penetrating agents do not interfere with the functions of other ingredients of the composition, and greatly enhance the spreading and climbing of the same.

If desired a suitable corrosion inhibitor, such as triethanolamine may be added, of which amounts from 0.5 to 1.5% are examples.

Examples of liquid mixtures for liquid sealing and dust laying are as follows:

Example 1

| | Percent |
|---|---|
| Neutral oil | 90 |
| Phenol | 10 |

Example 2

| | Percent |
|---|---|
| Neutral oil | 80 |
| Cresol | 20 |

Example 3

| | Percent |
|---|---|
| Neutral oil | 70 |
| Quinoline | 30 |

The foregoing are examples of liquid mixtures suitable for general treatment. When deposits or coatings of tar, resin and/or gum are excessive the following are more suitable in view of the increased concentration of the tar penetrating agent in the mixture.

Example 4

| | Percent |
|---|---|
| Neutral oil | 30 |
| Quinoline | 70 |

Example 5

| | Percent |
|---|---|
| Neutral oil | 30 |
| Phenol | 68 |
| Triethanolamine | 2 |

Example 6

| | Percent |
|---|---|
| Neutral oil | 40 |
| Cresol | 58 |
| Triethanolamine | 2 |

Example 7

| | Percent |
|---|---|
| Neutral oil | 30 |
| Phenol | 34 |
| Cresol | 34 |
| Triethanolamine | 2 |

Example 8

| | Percent |
|---|---|
| Quinoline | 25 |
| Phenol | 25 |
| Neutral oil | 48.5 |
| Triethanolamine | 1.5 |

Generally speaking, there may be substituted any other tar penetrating agent mentioned herein which preferably is one which does not attack cellulosic fibrous packing, if packed joints are present, or any combination of such tar penetrating agents may be substituted, preferably using a miscibility agent, should this be found necessary to form a single liquid phase, which is preferred to a plurality of liquid phases, although it is conceivalbe that the latter may be employed without departing from the broad concept of the invention.

Comparative tests show that whereas neutral oil alone failed to evidence any substantial solvent action on tar coated and liquid phase gum coated metal strips immersed therein for 35 days, the addition of 30% of phenol to neutral oil completely removed the tar in 45 minutes, and the gum in 27 minutes; the addition of 30% of cresol to neutral oil removed both tar and gum in 33 minutes; and the addition of 70% of quinoline to neutral oil removed the tar in 14 minutes and the gum in 15 minutes.

The treating liquid may be applied to the interior surface of a pipe section and/or to the packing in a joint in any desired manner.

If the main is already in service, sections of the main may be "blocked off" by means of inflated bags or other means, and the sections then completely filled with the liquid after which the liquid can be drawn off and re-used.

On the other hand, the liquid may be sprayed into the gas by the fogging procedure earlier mentioned so that the packing and/or dust sources take up the liquid from the gas stream or, in other words, so that the liquid is deposited from the gas stream onto the packing and/or onto the sources of dust.

In another method of application the liquid is introduced into the main at high points and allowed to run by gravity to low points where the excess can be drawn off.

Another method comprises inserting a long length of hose into the main with a spray at its end, or with a plurality of sprays distributed along its length, and pumping the treating liquid into the hose while withdrawing the hose either continuously or intermittently or otherwise, or while the hose remains stationary.

In the last three methods of application service on the line need not be interrupted. The packing becomes filled with the composition and dust sources become coated with the treating liquid. The wetting of finely divided material causes it to be bound together in a mass which prevents it from rising in a dust almost regardless of the velocity of the gas traveling through the main. The clogging of mains, meters, regulators and appliances is thus effectively prevented.

A typical gas main is illustrated in the drawing in which:

Figure 1 is a side elevation, partly in section, illustrating a gas main; and

Figure 2 is a cross-section on line 2—2 of Figure 1.

In the drawing the gas main 10 is shown with a joint comprising bell 11 and spigot 12 fitting within said bell and spaced therefrom. In the space between the bell and the spigot is cellulosic fibre packing 13 which may be tarred or untarred and a seal 14 of lead or other suitable material for holding the packing in place. The treating liquid 14 as illustrated is being run through the main by gravity. It contacts the bottom of the main and any deposits accumulated thereon. It also contacts the packing at space 16 which space is left between the spigot and the shoulder of the bell to provide for expansion and contraction due to temperature changes. The packing absorbs the liquid at 16 in the sense that the liquid enters in between the fibres and the liquid climbs and is carried up in the packing as shown by the outer group of arrows in Figure 2. The treating liquid also climbs up the metal walls of the main as illustrated by the inner group of arrows in Figure 2 to coat dust sources in addition to those along the bottom of the main.

The bulk of the treating liquid, of course, remains in the main only during the time that its flow from the point of introduction to the point of removal which usually is the nearest drip.

Any other means for applying the treating liquid to the packing and/or to the interior of the conduit may be employed. For instance in case of very large diameter mains the level of the liquid 15 may be raised or may be made to fill the entire main if desired, or the spray or fogging methods may be employed.

In the case of a welded main, or other main having joints in which cellulosic fibre packing is not present, the treatment becomes primarily one of dust laying.

While the invention has been described in connection with gas mains, it is to be understood that it is applicable to any part of a gas distribution system wherein similar problems may arise. It is also to be understood that the various agents referred to herein may be used either in the pure or commercially pure form, or in any other suitable form including the commercial and crude forms.

It is to be understood that the above particular description is by way of illustration and that changes, omissions, additions, substitutions, and/or modifications, might be made within the scope of the claims without departing from the spirit of the invention.

I claim:

1. A method for treating the interior of a gas distribution system which comprises applying to the interior of said system a liquid mixture comprising as a dust laying agent a neutral oil, comprised principally of aromatic compounds, the preponderant part of said oil having a boiling range included between 170° C. and 390° C., and as a climbing, spreading and tar, resin and gum penetrating agent at least one of a group consisting of phenols; heterocyclic compounds containing ring nitrogen; aldehyde; ketones; arylamines; aromatic alcohols; esters; and ethers.

2. A method for treating the interior of a gas distribution system which comprises applying to the interior of said system a liquid mixture comprising as a dust laying agent a neutral aromatic oil derived from tar naphtha, the preponderant part of said oil boiling between 170° C. and 390° C., and as a climbing, spreading and tar, resin and gum penetrating agent at least one of a group consisting of phenols; heterocyclic compounds containing ring nitrogen; aldehyde; ketones; arylamines; aromatic alcohols; esters; and ethers, said aromatic oil being substantially free from resin-forming constituents.

3. A gas conduit having interior dust sources wetted down by a liquid mixture comprising as a dust laying agent a neutral oil comprised principally of aromatic compounds, the preponderant part of said oil having a boiling range included between 170° C. and 390° C., and as a climbing, spreading and tar, resin and gum penetrating agent at least one of a group consisting of phenols; heterocyclic compounds containing ring nitrogen; aldehydes; ketones; arylamines; aromatic alcohols; esters; and ethers.

4. A gas conduit having interior dust sources wetted down by a liquid mixture comprising as a dust laying agent a neutral aromatic oil derived from tar naphtha, the preponderant part of said oil boiling between 170° C. and 390° C., and as a climbing, spreading and tar, resin and gum penetrating agent at least one of a group consisting of phenols; heterocyclic compounds containing ring nitrogen; aldehydes; ketones; arylamines; aromatic alcohols; esters; and ethers; said aromatic oil being substantially free from resin-forming constituents.

5. A joint in a gas distribution system comprising spaced cooperating elements, cellulosic fibrous packing such as jute between said cooperating elements positioned to form a seal, and a liquid sealing mixture in the interstices of said packing, said liquid sealing mixture comprising a neutral oil comprised principally of aromatic compounds the preponderant part of which has a boiling range included between 170° C. and 390° C., and a phenol.

6. A joint in a gas distribution system comprising spaced cooperating elements, cellulosic fibrous packing such as jute between said cooperating elements positioned to form a seal, and a liquid sealing mixture in the interstices of said packing, said liquid sealing mixture comprising a neutral oil comprised principally of aromatic compounds the preponderant part of which has a boiling range included between 170° C. and 390° C., and a quinoline.

7. A joint in a gas distribution system comprising spaced cooperating elements, cellulosic fibrous packing such as jute between said cooperating elements positioned to form a seal, and a liquid sealing mixture in the interstices of said packing, said liquid sealing mixture comprising a neutral oil comprised principally of aromatic compounds the preponderant part of which has a boiling range included between 170° C. and 390° C., and a nuclearly methylated aniline.

8. A liquid mixture for treating the interior of a gas distribution system which comprises a phenol and a neutral oil derived from coal tar solvent naphtha after the separation of coumarone and indene, said oil having a boiling range between 170° and 390° C.

JOHN R. SKEEN.